United States Patent [19]

Leins

[11] 4,122,673
[45] Oct. 31, 1978

[54] INTERNAL COMBUSTION ENGINE WITH AFTERBURNING AND CATALYTIC REACTION IN A SUPERCHARGER TURBINE CASING

[75] Inventor: Alfred Leins, Uhingen, Germany

[73] Assignee: J. Eberspächer, Esslingen am Neckar, Germany

[21] Appl. No.: 776,180

[22] Filed: Mar. 10, 1977

Related U.S. Application Data

[63] Continuation-in-part of Ser. No. 745,868, Nov. 29, 1976, abandoned, which is a continuation of Ser. No. 508,838, Sep. 24, 1974, abandoned.

[30] Foreign Application Priority Data

Sep. 28, 1973 [DE] Fed. Rep. of Germany ....... 2348866

[51] Int. Cl.$^2$ .......................... F01N 5/04; F02B 33/40; F01D 9/02; F01D 25/00
[52] U.S. Cl. ........................................ 60/274; 60/280; 60/619; 123/119 CD; 415/200; 415/212 A; 416/241 R
[58] Field of Search .............. 60/39.82 C, 39.5, 39.75, 60/39.23, 605, 614, 619, 200 A, 280, 274, 606, 613, 802, 39.17; 415/200, 212 R, 212 A; 416/241, 241 B; 123/119 C, 119 CD, 191 A; 431/7

[56] References Cited

U.S. PATENT DOCUMENTS

| | | | |
|---|---|---|---|
| 2,331,644 | 10/1943 | Altorfer et al. ...................... | 138/149 |
| 2,397,816 | 4/1946 | Sorensen ................................ | 60/614 |
| 2,470,702 | 5/1949 | Johansson .............................. | 60/619 |
| 2,583,651 | 1/1952 | Horning ................................. | 60/606 |
| 2,860,827 | 11/1958 | Ebli ....................................... | 417/407 |
| 3,124,930 | 3/1964 | Powers ................................... | 60/302 |
| 3,186,806 | 6/1965 | Stiles ..................................... | 60/306 |
| 3,232,044 | 2/1966 | Gratzmuller ................... | 123/119 CD |
| 3,301,530 | 1/1967 | Lull ................................... | 415/212 R |
| 3,459,167 | 8/1969 | Briggs et al. .................... | 123/191 A |
| 3,519,282 | 7/1970 | Davis ............................... | 415/212 R |
| 3,694,255 | 9/1972 | Brill-Edwards ................ | 415/212 A |
| 3,798,906 | 3/1974 | Wodlenweber ....................... | 60/280 |
| 3,947,545 | 3/1976 | Ishida et al. .......................... | 60/302 |

FOREIGN PATENT DOCUMENTS

| | | | |
|---|---|---|---|
| 588,160 | 12/1959 | Canada ............................... | 60/39.82 C |
| 1,467,142 | 12/1966 | France .............................. | 60/39.82 C |

*Primary Examiner*—Carlton R. Croyle
*Assistant Examiner*—Thomas I. Ross
*Attorney, Agent, or Firm*—Toren, McGeady and Stanger

[57] ABSTRACT

To remove pollutants in the exhaust gases from a liquid fuel driven engine, a turbosupercharger, including a turbine and a compressor, is combined with the engine to provide both afterburning and catalytic oxidation. The exhaust gases are accumulated to provide combustion in advance of the turbine. Further, air is branched off from the compressor and mixed with the gases flowing through the turbine to afford combustion of the gases after they pass through the turbine. Catalytically active surfaces are located within the turbine for the reduction of nitric oxides.

19 Claims, 5 Drawing Figures

INTERNAL COMBUSTION ENGINE WITH AFTERBURNING AND CATALYTIC REACTION IN A SUPERCHARGER TURBINE CASING

CROSS-REFERENCE TO RELATED APPLICATION

This is a continuation-in-part of prior application Ser. No. 745,868 filed Nov. 29, 1976, now abandoned, which was, in turn, a continuation of application Ser. No. 508,838 filed on Sept. 24, 1974, now abandoned.

SUMMARY OF THE INVENTION

The invention concerns the removal of pollutants in the exhaust gases from liquid fuel driven engines and, more particularly, it is directed to the combination of a turbosupercharger with such an engine for providing both afterburning and catalytic oxidation of the exhaust gases.

It is known that two methods can be used for cleaning or removing pollutants from exhaust gases. These two methods, catalytic oxidation and afterburning, can be used individually or jointly. In catalytic oxidation, the exhaust gas is passed over a catalyst consisting of an activated ceramic honeycomb structure so that catalysis takes place as the hot exhaust gases pass over the catalytic surface and nitric oxides are reduced. In afterburning, additional oxygen is introduced into the exhaust gases so that a combustion process can be initiated during which the combustible portions of carbon monoxide and hydrocarbons in the exhaust gas burn. It has been found that optimum cleaning of the exhuast gas is possible only by the combined use of both catalytic oxidation and afterburning.

In afterburning it has been known to supply additional combustion air into the exhaust gases as close as possible to the outlet valves, so that the characteristic high temperature of the exhaust gas is used to initiate combustion. In catalytic devices it is important that good thermal insulation is used whereby the oxidation of the combustion gases can take place at high temperatures. Accordingly, the catalysts are located as close as possible to the outlet valves or, in other words, the entire arrangement must be positioned directly adjacent to the engine.

Various arrangements are known for using both of these exhaust gas cleaning methods. However, afterburning has the disadvantage that it requires additional combustion chambers with an additional air pump for combustion and, as a result, is quite costly. On the other hand, catalytic oxidation has the disadvantage that the known catalysts are positioned in the exhaust line at a position where the pulsations of the exhaust gases are still too high so that the catalyst is unduly stressed. In both of these known methods there is the additional disadvantage that a power loss is unavoidable and results in a reduction in the efficiency of the engine.

In the present method the problems experienced in the past are overcome by combining both afterburning and catalytic cleaning with the combustible portions of carbon monoxide and hydrocarbons being removed by afterburning and with nitric oxides being reduced by catalysis.

Furthermore, in addition to the removal of pollutants from the exhaust gases, an increase in the power obtained from the engine is achieved by the use of turbosuperchargers. Surprisingly, it was found that turbosuperchargers are suitable for cleaning exhaust gases. Starting with the known catalytic oxidation and afterburning procedures, the present invention provides several stages of afterburning with the exhaust gases initially being accumulated in advance of the turbine of the turbosupercharger to increase the temperature and initiate combustion and, after the gases have passed through the turbine, subjecting them to a further afterburning which is initiated by mixing a portion of the air from the compressor with the exhaust gases passing through the turbine. It has been found that a very effective cleaning of the exhaust gases can be achieved by the afterburning in accordance with the present invention. It has also been found that the turbine acts like a throttle and the greater the throttling, the greater is the accumulation, with each accumulation being associated with a temperature increase and thus an improvement in the afterburning procedure. The accumulation afforded in accordance with the present invention, has the result that the temperature at the turbine inlet is higher than the temperature at the outlet valve of the engine. The accumulation can be regulated by properly selecting the turbine casing. The amount of air required for combustion, after flow through the turbine, is withdrawn from the compressor, which forms a part of the turbosupercharger, and is fed into the exhaust gases flowing through the turbine so that combustion can take place with the requisite excess oxygen.

It has been found expedient, in accordance with another feature of the invention, to pre-heat the combustion air in a separate flow duct of the turbosupercharger before it is used in burning the exhaust gases after they have passed through the turbine. Another characteristic of this feature is that the temperature level attained with the accumulation procedure can be maintained.

To improve the removal of pollutants from the exhaust gas, catalytic materials are combined in the turbine to achieve reduction of nitric oxides. The invention has shown that both afterburning and catalytic reduction of the impurities in exhaust gases can take place in a turbosupercharger. In a known turbosupercharger a metallic layer with a low thermal conductivity has been arranged on the inner walls of the exhaust gas flow duct. This metallic layer can be a sheet formed on the nodular cast iron of the turbine housing during its manufacture. This arrangement protects the turbine casing against overheating. Further, the metal layer protects the nodular cast iron of the turbine housing against mechanical stresses. To afford an improved heat insulation of the turbosupercharger, the present invention suggests the introduction of a heat insulation between the metallic lining of the exhaust duct and the turbine housing. A ceramic layer can be used as the insulation and preferably such a layer consists of aluminum oxide ($Al_2O_3$) with zirconium oxide ($ZrO_2$). Such an arrangement ensures maximum protection of the turbine against harmful overheating. However, it is possible with such an arrangement that thermal stresses in the turbosupercharger may still be too high, accordingly, another feature of the invention is the provision of air inlet bores in the casing of the turbosupercharger. These bores provide cooling air in a certain degree to the turbosupercharger so that a cooling air mist is provided. A further improvement involves the use of air passages through the metal layer. In this way a pressure equalization is obtained between the pressure and suction sides and a better mixing occurs. The afterburning following the passage of the exhaust gases through the turbine is improved by pre-heating the air branched off from the compressor before it is mixed with the exhaust gases. The air is heated in a separate flow duct which is wound about the exhaust gas duct.

It has been found that catalytic cleaning can be carried out within the turbosupercharger. For example, a nozzle ring with blades formed of a porous ceramic material activated for catalysis, can be positioned in the torus-shaped space between the turbine wheel inlet and the exhaust gas flow duct. With such an arrangement, the exhaust gases are cleaned catalytically during their passage through the turbosupercharger. In another embodiment of the invention the nozzle ring is formed of a refined steel and is covered with a layer of copper oxide. Thus the nozzle ring is expediently designed for catalytic cleaning. It is very important, however, that a monolith or block is arranged as a catalyst in the closed duct at the inlet into the turbine casing. At the exhaust gas inlet or outlet of the turbine, a sufficiently large catalyst can be installed so that the residence period of the exhaust gas while passing over the catalyst is adequate. A further improvement in the catalytic action can be provided, in accordance with the invention, by using a turbine wheel of refined steel, such as an austenitic steel, with an electroplated copper coat in the turbocharger, since it is known that such a copper coat contributes substantially to the catalysis.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

Figure 1:
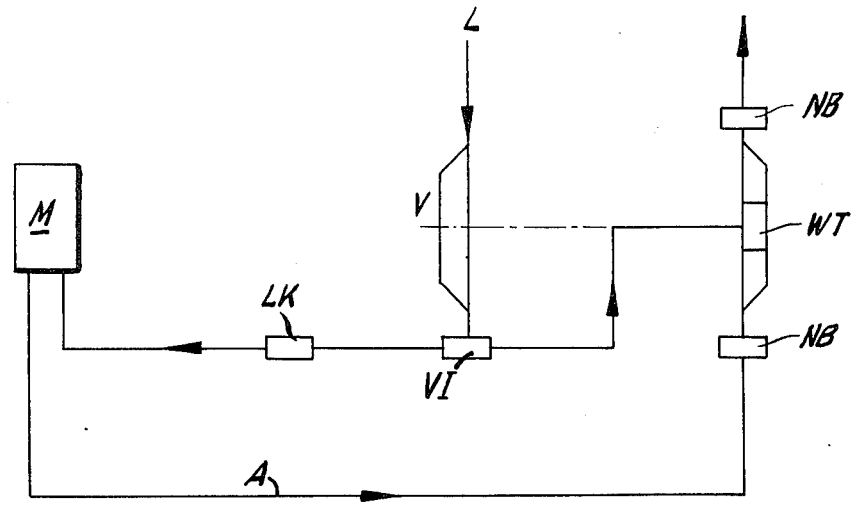
FIG. 1 is a schematic showing of an engine and turbosupercharger embodying the present invention.

In FIG. 1 a schematic arrangement is shown including a liquid fuel driven piston engine M to which both air-carrying pipes L and exhaust gas pipes A are connected. During operation, exhaust gases are accumulated by the engine M in an exhaust bend, not shown, and also in the turbine. The combustion or afterburning of CO— and CH— compounds is effected by a reaction caused by the accumulation of the exhaust gases and the resultant pressure and temperature increases.

The turbosupercharger consists of a turbine WT and a compressor V. The air-carrying pipes L initially introduce the air into the compressor V from which it is directed through a supercharger intercooler VI for supplying the air into the engine M. Additionally, a branch of the air-carrying pipes L extends between the supercharger intercooler VI and the turbine WT. An afterburner NB is located in the path of the exhaust gases through pipe A before the gases enter the turbine WT. Further, another afterburner NB is located downstream from the outlet of the turbine.

Figure 2:
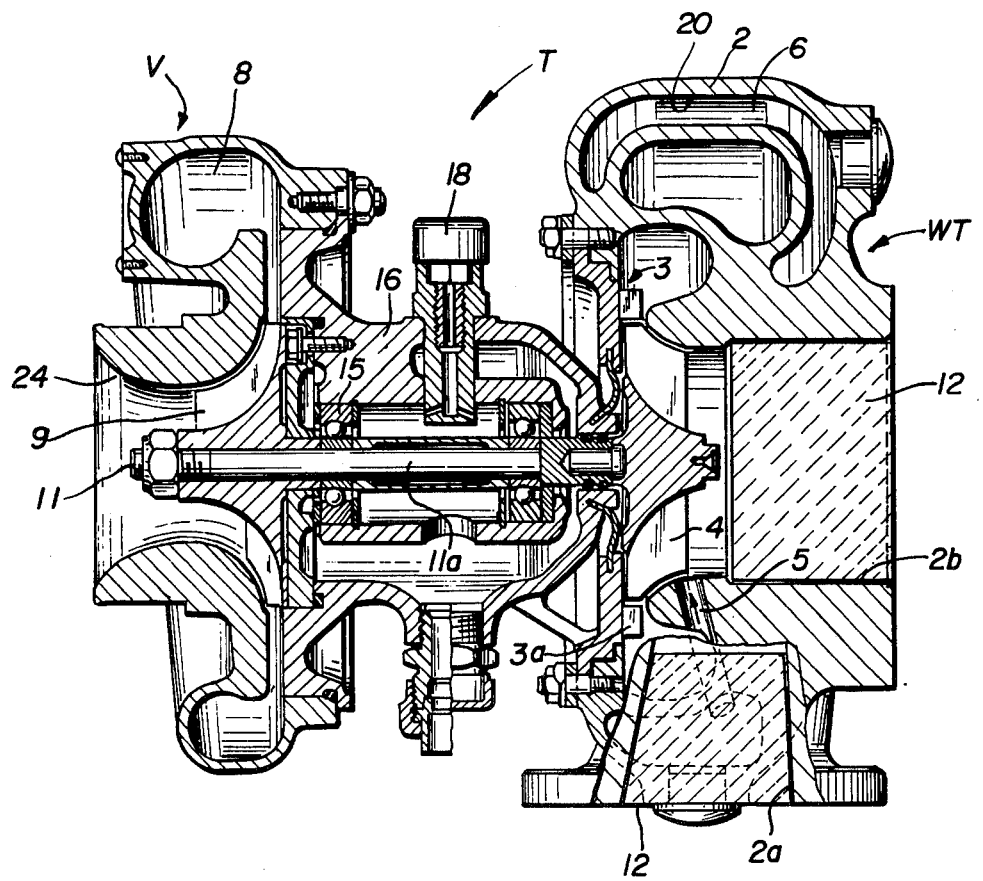
FIG. 2 is a sectional view of a turbosupercharger constructed in accordance with the present invention.
Figure 2A:
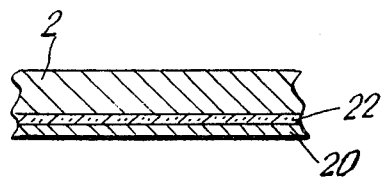
FIG. 2A is an enlarged sectional view of a portion of the turbine housing.

In FIG. 2 the turbocharger T is illustrated in cross section, and its turbine part WT includes an air-cooled turbine housing 2, a nozzle ring 3 and a turbine wheel 4. Turbine housing 2 has an exhaust gas inlet 2a and an exhaust gas outlet 2b. The turbine is constructed to provide a catalytic action for removing the nitric oxides from the exhaust gases as they pass through the turbine. Further, in addition to the afterburning which takes place in advance of the turbine, an additional afterburning occurs downstream from the outlet 2b from the turbine housing.

The compressor of the radial flow type includes a compressor scroll 8 and compressor impeller 9. Air enters the compressor through the inlet 24, note the arrow showing the direction of inlet air flow, is compressed to the desired extent and is deflected in the radial direction.

The turbine rotor 11 includes the turbine wheel 4 welded on shaft 11a and the compressor impellor 9 which is shrunk on the shaft 11a. The shaft is packed with packing elements 14 and braced by a self-locking nut. The turbine rotor 11 is mounted in an overhung position in the ball bearings 15 located in the bearing housing 16. This arrangement ensures a soft, quiet running of the unit.

The shaft 11a, which is hollow in the range of the weld, acts as a heat choke and dams the heat flow from the turbine wheel 4 to the bearing housing 16. The bearing housing 16 is designed so that heat flow from the hot turbine side to the bearing and to the compressor is as small as possible. Between the bearing flange and the bearing housing on the turbine side is provided a separating plate 13 formed of a low thermal conductivity material.

The lubricating oil necessary for the exhaust gas driven-turbosupercharger is taken from the engine oil circuit and is reduced to the pressure required in the turbosupercharger by an oil choke 18 installed in the oil supply of the turbosupercharger.

During the operation of the system shown in FIG. 1, the major part of the compressed air from the compressor V as used to charge the engine M. As can be noted in FIG. 1, an air filter LK is located in the air-carrying pipes L extending between the compressor V and the engine M to afford regulation of the air flow. The control of the compressed air flow can be used both for the air consumption in the engine and for the afterburning of the exhaust gases. As the compressed air flows from the compressor V it passes through the supercharger intercooler VI and then to the engine carburetor for preparation of the mixture, or, if an injection pump is used, it flows directly into the engine.

The turbine part WT of the turbosupercharger shown in FIG. 2 can be used to particular advantage for cleaning the pollutants from the exhaust gases discharged from the engine M. As distinguished from known turbines, the turbine WT contains catalysts in the form of an activated block or monolith 12 in the exhaust gas inlet 2a and in the exhaust gas outlet 2b from the turbine housing 2. The blocks 12 are arranged in the inlet and the outlet so the exhaust gases are forced to flow through them. Alternatively, activated pellets could be used in place of the activated block. Additionally, the nozzle ring 3 and the turbine wheel 4 are both formed of a high-grade nickel alloy base electroplated with a copper layer 14 so that their surfaces also act as catalysts.

On the nozzle ring 3 and turbine wheel 4, the interaction between the copper layer and the nickel alloy base affords a surface which behaves similar to that of the known nickel-copper catalysts. The turbine wheel 4 of the exhaust gas turbine consists of a 65% Ni heat-resistant alloy. The entire surface of the turbine wheel including the blades is covered with the copper layer or coat. Due to the interaction between the copper coating and the nickel base, the surface of the wheel behaves in a manner similar to a Cu-Ni catalyst. Because of the more stable supporting structure, higher temperature levels can be permitted, so that lead deposits, if any, are burnt. The following chemical reaction takes place:

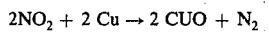

$$2NO_2 + 2 Cu \rightarrow 2 CUO + N_2$$

It is also possible to design the nozzle ring as a monolith.

Air required for the afterburning of the exhaust gases subsequent to their passage through the turbine is introduced in the exhaust gases through inlet bores 5 provided in the turbine housing 2. Prior to the introduction of the air into the bores 5, it is heated, in indirect heat transfer relation, with the exhaust gases flowing in the flow duct 6. An excellent mixing of the heated air passing through the bores 5 is obtained by the rotating blades on the turbine wheel 4.

The air branched off from the compressor V to the turbine WT is passed in counter flow with the exhaust gases within the flow duct 6 so that very large contact surfaces are provided for implementing the indirect heat transfer. As indicated, the hot exhaust gases are used as the heat source for the air supplied from the compressor V to the turbine WT and these exhaust gases expand in the turbine. A special secondary combustion chamber is not required because the afterburning associated with the turbine takes place, on one hand, in front of the turbine and, on the other hand, after the turbine. As a result, the construction of a plant embodying the present invention is considerably simpler than that of a conventional plant.

Though not shown, radiators are arranged in side by side relationship within the supercharger intercooler VI for withdrawing heat from the compressed air. Cooling water used in the engine can be utilized as the cooling medium or an air current produced by the cooling blower of the engine can be employed. Further, the cooling air required can be supplied in any other way. The air cooled in the supercharger intercooler VI has a greater density, and thus results in a higher performance of the engine and a reduction of the process temperature in the combustion chamber of the engine. The reduction of the process temperature effects a considerable reduction in the nitric oxide values.

Figure 2C:
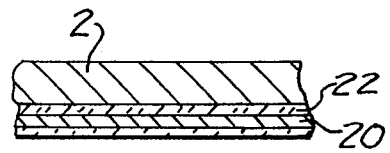
FIG. 2C is an enlarged view of another embodiment of a portion of the turbine housing.
Figure 2B:
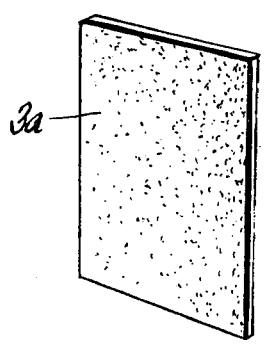
FIG. 2B is an enlarged view of a blade on the nozzle ring in the turbine.

In the exhaust gas flow duct 6 within the turbine housing 2 a metal layer having a low thermal conductivity is provided on the inner walls. An example of a metal with a low thermal conductivity is austenitic steel having a high nickel content. Further, a heat insulation 22 is provided between the metal layer 20 and the turbine housing 2. Moreover, a ceramic layer could be used on the inner wall surface of the flow duct as shown in FIG. 2C. Examples of a ceramic layer usable under such conditions are aluminum oxide ($Al_2O_3$) with zirconium oxide ($ZrO_2$). The metal layer 20 can be provided, at least in part, with air passages.

In carrying out the catalytic reduction of the exhaust gases, the nozzle ring 3 can be provided with blades 3a formed of a porous ceramic material activated for catalysis. The nozzle ring is located in the radial torus between the inlet to the turbine wheel 4 and the flow duct 6.

The nozzle ring can be formed of steel with a copper layer of coating, the copper layer having a thickness of about 50–200 microns. In place of steel, platinum or palladium could be used. Such metals, however, are sensitive to lead. Accordingly, it has also been proposed to make the nozzle ring of $Al_2O_3$ + $SiMgO_2$ with a platinum or palladium coating.

An example of a material used in the activated block or monolith is sintered aluminum - magnesium - silicon - oxide ($Al_2O_3$ + $SiMgO_2$) coated with a noble metal, such as, platinum or palladium.

While a specific embodiment of the invention has been shown and described in detail to illustrate the application of the inventive priciples, it will be understood that the invention may be embodied otherwise without departing from such principles.

I claim:

1. Method of cleaning the exhaust gases from a liquid fuel driven engine utilizing a turbosupercharger connected to the engine and including a turbine having a turbine casing, and a compressor, comprising the steps of accumulating the exhaust gases from the engine for increasing the temperature of the gases, initiating combustion of unreacted fuel in the exhaust gases for effecting a first afterburning between the engine and the turbine and before passing the exhaust gases into the turbine casing, passing the exhaust gases through the turbine casing, compressing fresh air within the compressor, withdrawing a part of the compressed air from the compressor and adding it to the exhaust gases passing through the turbine casing, providing a second afterburning of the mixture of exhaust gases and compressed air after the mixture of exhaust gases and compressed air have exited from the outlet from the turbine casing, and catalytically treating the exhaust gases within the turbine casing after the first afterburning and before the second afterburning for reducing the nitric oxide content in the exhaust gases including catalytically treating the exhaust gases within the turbine casing at the inlet into and the outlet from the turbine casing.

2. Method of cleaning the exhaust gases from a liquid fuel driven engine, as set forth in claim 1, including the step of preheating the air from the compressor by passing the air in indirect heat transfer relationship with the exhaust gases supplied to the turbine casing of the supercharger before adding the air into the exhaust gases within the turbine.

3. Apparatus for cleaning the exhaust gases from a liquid fuel driven engine comprising a turbosupercharger, said turbosupercharger comprising a turbine and a compressor interconnected with said turbine, said turbine including a turbine housing, air carrying pipes arranged to supply air from said compressor to the engine, a supercharger intercooler located in said air carrying pipes between said compressor and the engine, said air carrying pipes including a branch pipe extending from said supercharger intercooler into said turbine housing, first exhaust gas pipe means connected to said turbine housing and arranged to convey exhaust gases thereto from the engine and to provide a space for effecting a first afterburning of the exhaust gases before the exhaust gases are introduced into said turbine housing, said turbine housing forming a flow duct therein for flowing exhaust gases within said turbine housing, said turbine housing having an inlet and an outlet, second exhaust gas pipe means connected to the outlet from said turbine housing for providing a space for effecting a second afterburning of the exhaust gases after they exit from the outlet of said turbine housing, a layer of a low thermal conductivity material lining said flow duct for exhaust gases, and catalytic means located in said turbine housing for providing a catalytic effect on the exhaust gases flowing therethrough and including a first catalytic member located in said turbine housing inlet for providing a catalytic effect on the exhaust gases flowing through the turbine housing inlet and a second catalytic member located in said turbine housing outlet for providing a catalytic effect on the exhaust gases flowing through the turbine housing outlet so that the exhaust gases from the engine flow through and are catalytically treated by said first and second catalytic members on entering into and exiting from said turbine housing.

4. Apparatus, as set forth in claim 3, wherein heat insulation is provided between the layer lining said flow duct and said turbine housing.

5. Apparatus, as set forth in claim 3, wherein said layer having a low thermal conductivity is a ceramic material.

6. Apparatus, as set forth in claim 5, wherein the ceramic material of said layer comprises aluminum oxide ($Al_2O_3$) with zirconium dioxide ($ZrO_2$).

7. Apparatus, as set forth in claim 3, wherein air inlet bores are provided in said turbine housing for supplying compressed air into the exhaust gases flowing through said turbine.

8. Apparatus, as set forth in claim 3, wherein said layer is provided at least in part with air passages.

9. Apparatus, as set forth in claim 3, characterized in that said branch from said air carrying pipes for supplying compressed air to said turbine includes a conduit arranged in said turbine housing and disposed in indirect heat transfer relation with said flow duct for the exhaust gases in said turbine housing.

10. Apparatus, as set forth in claim 3, wherein said turbine includes a nozzle ring having blades, said nozzle ring being formed of a steel base having a copper oxide layer plated thereon, said turbine further includes a turbine wheel located radially inwardly of said nozzle ring, said flow duct located radially outwardly relative to said nozzle ring and said flow duct and turbine wheel forming a torus shaped space therebetween with said nozzle ring being located in said torus shaped space.

11. Apparatus, as set forth in claim 3, wherein said turbine includes a turbine wheel comprising an austenitic steel base with a layer of copper plated on said base.

12. Apparatus for cleaning the exhaust gases from a liquid fuel driven engine comprising a turbosupercharger, said turbosupercharger comprising a turbine and a compressor, said turbine including a turbine housing, air carrying pipes arranged to supply air from said compressor to the engine, a supercharger intercooler located in said air carrying pipes between said compressor and the engine, said air carrying pipes including a branch pipe extending from said supercharger intercooler into said turbine housing, an exhaust gas pipe connected to said turbine housing and arranged to convey exhaust gases thereto from the engine, said turbine housing forming a flow duct therein for flowing exhaust gases within said turbine housing, said turbine housing having an inlet and an outlet, a layer of a low thermal conductivity material lining said flow duct for exhaust gases, and catalytic means located in said turbine housing for providing a catalytic effect on the exhaust gases flowing therethrough and including a first catalytic member located in said turbine housing inlet and a second catalytic member located in said turbine housing outlet so that the exhaust gases from the engine flow through said first and second catalytic members on entering into the exiting from said turbine housing and said turbine includes a nozzle ring having blades, said blades being formed of a porous ceramic material having a catalytic effect on the exhaust gases flowing through said turbine, said turbine further includes a turbine wheel located radially inwardly relative to said nozzle ring, said flow duct located radially outwardly relative to said nozzle ring and said flow duct and turbine wheel forming a torus shaped space therebetween with said nozzle ring being located in said torus shaped space.

13. Apparatus, as set forth in claim 12, wherein heat insulation is provided between the layer lining said flow duct and said turbine housing.

14. Apparatus, as set forth in claim 12, wherein said layer having a low thermal conductivity is a ceramic material.

15. Apparatus, as set forth in claim 14, wherein the ceramic material of said layer comprises aluminum oxide ($Al_2O_3$) with zirconium dioxide ($ZeO_2$).

16. Apparatus, as set forth in claim 12, wherein air inlet bores are provided in said turbine housing for supplying compressed air into the exhaust gases flowing through said turbine.

17. Apparatus, as set forth in claim 12, wherein said layer is provided at least in part with air passages.

18. Apparatus, as set forth in claim 12, characterized in that said branch from said air carrying pipes for supplying compressed air to said turbine includes a conduit arranged in said turbine housing and disposed in indirect heat transfer relation with said flow duct for the exhaust gases in said turbine housing.

19. Apparatus, as set forth in claim 12, wherein said turbine includes a turbine wheel comprising an austenitic steel base with a layer of copper plated on said base.

* * * * *